July 9, 1963

D. O. NOORLANDER 3,096,740

TEAT CUP LINER CONSTRUCTION

Filed Aug. 25, 1961

INVENTOR.

DANIEL O. NOORLANDER

BY Miketta and Glenny
ATTORNEYS.

July 9, 1963  D. O. NOORLANDER  3,096,740
TEAT CUP LINER CONSTRUCTION
Filed Aug. 25, 1961  2 Sheets-Sheet 2

INVENTOR.
DANIEL O. NOORLANDER
BY
Miketta and Glenny
ATTORNEYS

United States Patent Office 3,096,740
Patented July 9, 1963

3,096,740
TEAT CUP LINER CONSTRUCTION
Daniel Olie Noorlander, Chino, Calif.
(5501 Maywood Road, Madison 14, Wis.)
Filed Aug. 25, 1961, Ser. No. 134,019
7 Claims. (Cl. 119—14.52)

This invention relates to an improved teat cup for use in conjunction with milking machines used on milk-producing animals such as cows and goats. More specifically the present invention relates to improved teat cup liners or inflations. The present patent application for this invention is a continuation-in-part of my patent application Serial No. 2,273 filed January 13, 1960, and entitled, "Teat Cup Inflation," now Patent 2,997,980, issued August 29, 1961. It will be understood that the disclosure of said patent application is hereby incorporated by reference into the disclosure of the present patent application.

The conventional teat cup includes a tubular liner or inflation of elastic material extending longitudinally of a generally cylindrical shell of rigid material, typically metal. The ends of the inflation and shell are maintained in hermetically sealed relation, with the inflation under longitudinal tension, forming an annular chamber extending substantially the length of the shell. The chamber is connected through a pulsator to a source of sub-atmospheric pressure so that the pressure in the annular chamber can be cyclically alternated between such sub-atmospheric pressure and a higher pressure, typically atmosphere. A constant vacuum line connected to the lower end of the inflation maintains the interior of the inflation at a sub-atmospheric pressure, and the alternating pressure in the annular chamber periodically forces the inflation walls inwardly. Since the animal's teat extends downwardly into the inflation only a portion of the length of the inflation, inward movement of the inflation walls not only exerts pressure, in the upper portion of the inflation, on the teat, but also, in the lower portion of the inflation below the teat, tends to collapse the inflation walls together, thus advantageously tending to relieve the lower teat end from exposure to the vacuum in the constant vacuum line.

It is important that the upper portion of the inflation grip the teat snugly to prevent vacuum loss, but not so tightly as to collapse the internal milk canal in the teat tissue, particularly in the uppermost part of the teat, where it joins the udder. Thus the inflation must be under tension, and its bore diameter, in unstressed condition, is consequently made to be slightly smaller than the teat diameter, thereby creating some radial tension when the teat cup is mounted on the teat. Additionally, to effectively supplement the radial tension, the inflation is maintained under substantial longitudinal tension by its mounting within the shell.

Certain disadvantages result from the foregoing. Mechanical devices are needed for initial longitudinal stressing and assembling of the inflation in the shell. More importantly, the elastic material of the inflation loses its shape and tension rapidly. When natural rubber is used, it is found that it absorbs butterfat up to as much as 15% of its weight after only a few hundred milkings, with a resulting expansion and loss of elasticity. Synthetic rubbers generally have a higher resistance to fat absorption, but tend to lose elasticity fairly rapidly.

The present invention overcomes the above disadvantages while providing additional advantages, economies and conveniences in use. In its preferred form it includes an inflation of elastic material having high resistance to absorption of butterfat and similar substances in milk, together with elastic means closely surrounding the upper teat-receiving portion of the inflation and in contact therewith for effectively reinforcing the inflation elasticity and thus minimizing bulging of the inflation with use, while permitting lessened tension on the inflation and thereby facilitating cyclic teat massage. Thus the elastic means is shielded from direct contact with the milk, and therefore from absorption of butterfat and other oils, so that it retains its elasticity for a longer time; and it may be easily removed, either to be replaced by a new such means and thus to economically prolong the useful life of the inflation proper, or for substitution of a different size of elastic means and thereby adapt the complete inflation for use on teats of varying sizes.

Accordingly it is an object of the invention to provide and disclose a novel inflation construction for use in a teat cup. Additional objects and purposes are to provide such a construction including a separate elastic component closely surrounding the upper teat-receiving part of an inflation; to provide such a construction permitting substantially less longitudinal tension to be imposed on the inflation for proper operation; to provide such a construction virtually eliminating the tendency of teat cup inflations to crawl up the teat during use and thereby damage udder tissue; and for other and related objects and purposes as will become clear from a reading of the following description of illustrative embodiments thereof, taken in connection with the accompanying drawing in which:

Figure 1:
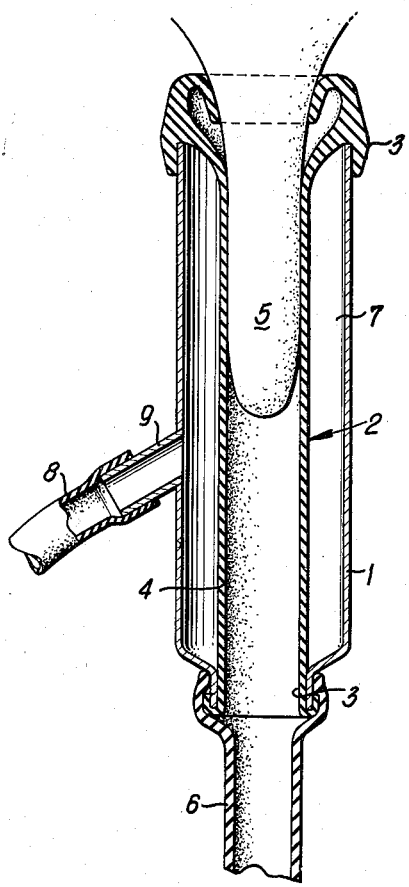
FIG. 1 is a longitudinal sectional view of a conventional teat cup with a portion of a teat received therein.

In the conventional construction illustrated in FIG. 1, a tubular shell 1, usually metal, has mounted therein a flexible tubular liner or inflation indicated generally at 2, the ends 3 being in hermetically sealed relation with the shell ends. The inflation wall 4 is typically cylindrical and receives within the upper portion a teat 5. The wall 4 is spaced inwardly from shell 1, forming an annular chamber 7 connected to hose 8 through nipple 9 for alternating or pulsating pressure, as is well known in the art. At its bottom, inflation 2 communicates with milk outlet hose 6 maintained under substantially constant sub-atmospheric pressure.

Figure 2:
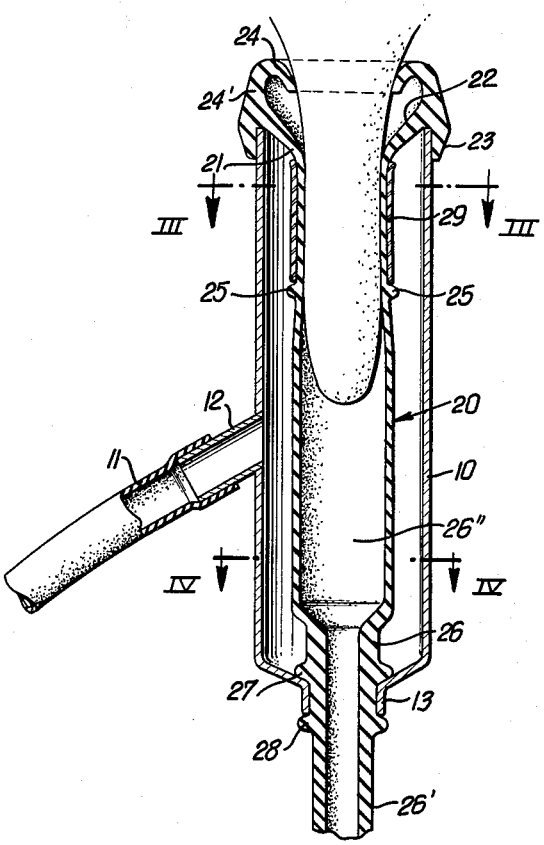
FIG. 2 is a longitudinal section of a teat cup with one form of the inflation of the present invention, taken along line II—II of FIG. 3.
Figure 4:
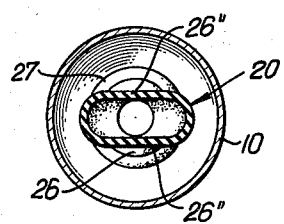
FIG. 4 is a cross sectional view of FIG. 2 taken along the line IV—IV.
Figure 3:
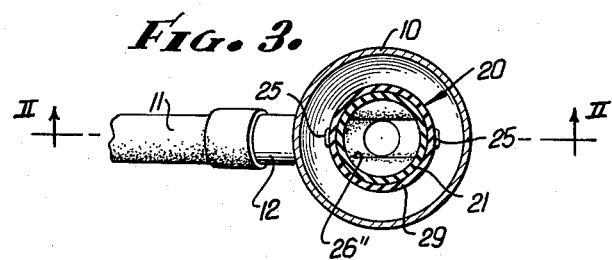
FIG. 3 is a cross sectional view of FIG. 2 taken along the line III—III with the teat removed.

In FIGS. 2 to 4, the teat cup of the present invention includes a rigid outer shell 10 usually made of metal and an inflation 20. The shell 10 is connected to the pulsator rubber tube 11 by means of a nipple 12. The lower end of shell 10 flares inwardly to form a neck 13.

The inflation indicated generally at 20 includes an upper section 21 adapted to receive the major portion of the teat of a milk-producing animal, a lower section 26 adapted to receive the milk from the teat and to periodically relieve the vacuum on the teat and an elastic sleeve 29 maintained in position by support means 25. For convenience of reference, the portion of the inflation in the vicinity of or slightly below support means 25 will be referred to as the junction section of the inflation, where the generally cylindrical upper section 21 thereabove merges with the lower section 26 therebelow, preferably having a contour described in detail below. Because of the wide variation of length of teats among different cows, the precise location of the junction section necessarily correspondingly varies. The teat-receiving section 21 of inflation 20 is surmounted by a rim 22. A lip 23 extends downwardly from the outer edge of rim 22. The inner surface of lip 23 is maintained in sealed relation with the outer surface of shell 10 by the stretching of lip 23 around shell 10. Flange 24 extends inwardly from the outer edge of rim 22 and is connected to the outer edge of rim 22 by a vertical section 24'. The upper surface of flange 24 is maintained in sealed relation with the outer surface of the teat inserted in the teat cup by the stretching of flange 24 around the teat. The support means may take the form of outwardly projecting protuberances or lugs 25 which extend from the sides of the lower part of teat-receiving section 21. Lugs 25 provide means for maintaining the elastic sleeve 29 in position surrounding the upper part of teat-receiving section 21.

The lower milk-receiving section 26 of inflation 20 has two spaced annular ridges 27 and 28 between which neck 13 of shell 10 is seated. The outer surface of milk-receiving section 26 is maintained in sealed relation with the inner surface of neck 13 by the compressing of milk-receiving section 26 with neck 13. In addition, lower section 26 has longitudinally extending walls 26'' with normally flat opposing internal surfaces that are spaced apart only a slight distance over substantially their entire area. It should be noted that both teat-receiving section 21 and milk-receiving section 26 are usually maintained in slight longitudinal tension by stretching them lengthwise between the upper and lower ends of shell 10. Milk-receiving section 26 has an extension 26' which is connected to a vacuum source (not shown) and a container (not shown) for the milk withdrawn from the teat.

Figure 5:
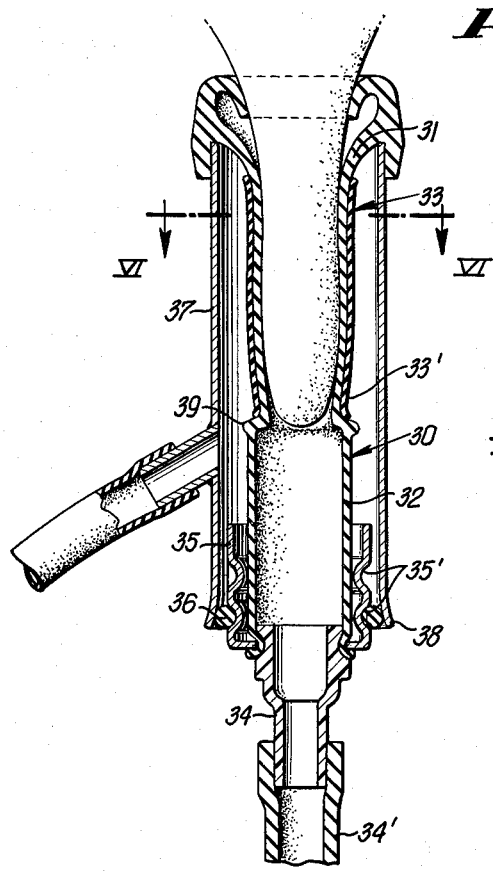
FIG. 5 is a longitudinal section of a teat cup with another form of the inflation of the present invention, taken along line V—V of FIG. 6.
Figure 6:
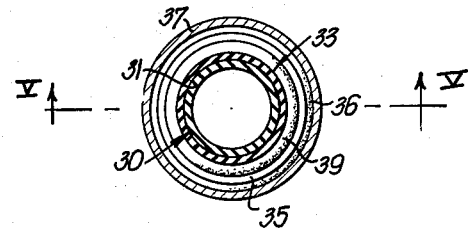
FIG. 6 is a cross sectional view of FIG. 5 taken along the line VI—VI, omitting the laterally projecting nipple and tube connected thereto.

In FIGS. 5 and 6 another form of the inflation of the present invention is illustrated. In FIGS. 5 and 6, the inflation 30 has an upper section 31 adapted to receive the teat of a milk-producing animal, a lower section 32 adapted to receive the milk from the teat and to periodically relieve the vacuum on the teat and an elastic sleeve 33 Inserted in the lower section 32 is a transparent connection 34 which conducts the milk from lower section 32 to an extension 35. Extension 35 is the conduit to a vacuum source (not shown) and a container (not shown) for the milk withdrawn from the teat. Lower section 32 is itself inserted in a metal collar 35 so that a tight seal between connection 34 and collar 35 is formed by lower section 32. Collar 35 has circumferential grooves 35' in which an elastic ring 36 may be seated. A tight seal between collar 35 and shell 37 is formed by ring 36 when upper section 31 of inflation 30 is placed on shell 37 and inflation 30 is stretched so that ring 36 is seated against flange 38 of shell 37. The plurality of grooves 35' permit adjusting the amount of longitudinal tension imposed on inflation 30.

In the form of inflation in FIGS. 5 and 6 the sleeve 33 extends below the end of the teat and terminates in a tapered portion 33' which curves inwardly. Tapered portion 33' aids maintaining sleeve 33 in position when lower section 32 of inflation 30 is periodically collapsed. In addition, inflation 30 has a circumferential ridge 39 for maintaining sleeve 33 in position.

Figure 7:
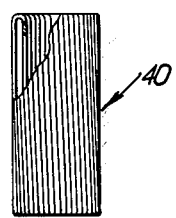
FIG. 7 is a side view, with a part broken away, of another form of the elastic means of the present invention, i.e., an elongated rectangular spring whose ends are attached together to form a circular expansion band.
Figure 8:
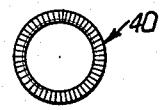
FIG. 8 is a top view of the elastic means of FIG. 7.

In FIGS. 7 and 8, an elongated rectangular metal spring joined at its ends to form a cylindrical expansion band 40 is illustrated. Band 40 may be used in place of sleeve 29 on the inflation 20 or sleeve 33 on the inflation 30. Band 40 extends a substantial distance axially thereof and thus distributes the force exerted by the spring when stretched substantially equally over the widest possible area and so as to permit greater expansion at the top. In this way, concentration of the tension so as to cause pinching of the teat is avoided.

In accordance with the objects of the invention, both the teat-receiving section and the milk-receiving section of the inflation may be made of flexible material having a high oil resistance. Such material need not have a high elasticity. Synthetic rubber such as neoprene, Buna-N and Buna-S have been found to be satisfactory. Likewise the elastic means which provides the main support for the teat in the teat cup may be made of a flexible material having high elasticity. Elastic means such as a natural rubber sleeve or an elongated metal spring have been found to be satisfactory.

It will be noted that the elastic means such as the rubber sleeve or metal spring may be removable from the teat-receiving section. Consequently when they become fatigued, only that part of the inflation need be replaced. Likewise, if a single teat-receiving section is used with teats of various sizes, the elastic means may be replaced accordingly. Such adjustment insures the proper fit of the teat cup and prevents "crawl-up" on smaller teat sizes. If desired, the elastic means may have a conical form to conform to the shape of the teat. In this way, the tension throughout the elastic means is equalized and excessive fatigue at the top of the elastic means is avoided.

In accordance with another object of the invention, the inner perimeter of the elastic means is preferably slightly smaller than the outer perimeter of the teat-receiving section. When the elastic means and teat-receiving section both have a circular cross section, it has been found that having the inner diameter of the elastic means about one-sixteenth inch smaller than the outer diameter of the teat-receiving section gives excellent results for milking cows. Differences of more than about one-eighth inch have also been found satisfactory. If desired, the inner diameter of the elastic means may be about equal to the outer diameter of the teat-receiving section. However, it should not be substantially larger since then the elastic means would not provide proper support for the teat and would permit "crawl-up."

It should be noted that small lugs on the teat-receiving section such as lugs 25 in FIGS. 2 and 3 provide a simple means for maintaining the elastic means in position surrounding the upper part of the teat-receiving section. In place of such lugs a circumferential ridge may be used as in FIGS. 5 and 6 or a circumferential groove with a mating ridge on the inner surface of the sleeve. Likewise, the elastic means may be maintained in position by a spacer sleeve between it and the junction of the inflation with the shell. Also elastic means itself may have an extension so that it is supported by the junction of the inflation and the shell. If desired, the elastic means may also be maintained in position by actual bonding to the teat-receiving section with an adhesive or by vulcanization. In any event, it can be seen that the elastic means may be maintained in position by any convenient means.

Preferably the teat cup inflation of the present invention should include features set forth in applicant's aforementioned copending application. As already noted, the teat cup inflation of the present invention permits the use of thinner walls and lower tension in the lower milk-receiving section. Applicant's copending application teaches a lower milk-receiving section having longitudinally extending walls with normally flat opposing internal surfaces that are spaced apart only a slight distance over substantially their entire area as shown in FIGS. 2–4. When these features of both applications are combined, superior results are obtained. In this connection, it should be noted that the teat cup inflation of the present invention need not initially have a circular cross section. For example, as shown in the copending application, the inflation may initially have a "cloverleaf" cross section which conforms to the shape of the teat when placed on the teat. Also as shown, the teat cup inflation of the present invention may consist of one piece contacting the milk as in FIGS. 2-4 or multiple pieces contacting the milk as in FIGS. 5 and 6. One piece inflations have the advantages of economy and simplicity. The multiple piece inflation has the advantages of being able to adjust the longitudinal tension and permitting direct observation of milk flow from the teat.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

I claim:

1. An improved, long-wearing, controllable-tension, controllable-perimeter teat cup inflation comprising: an upper section adapted to receive at least a substantial portion of the teat of a milk-producing animal, said teat-receiving section consisting of flexible material; separate elastic means surrounding at least a portion of said teat-receiving section, said elastic means having, when unstressed, an inner perimeter no greater than the outer perimeter of said teat-receiving section; and support means for maintaining said elastic means in position.

2. The teat cup inflation as stated in claim 1 wherein the inner perimeter of said elastic means is slightly smaller than the outer perimeter of said teat-receiving section.

3. The teat cup inflation as stated in claim 1 wherein said teat-receiving section is substantially cylindrical in shape when unstressed by the teat.

4. The teat cup inflation as stated in claim 1 wherein said elastic means consists of a sleeve of rubber-like material.

5. The teat cup inflation as stated in claim 1 wherein said sleeve consists of a metallic spring.

6. An improved teat cup inflation comprising: an upper section adapted to receive the teat of a milk-producing animal, said treat-receiving section consisting of flexible material; separate elastic means surrounding at least a portion of said teat-receiving section, said elastic means having, when unstressed, an inner perimeter no greater than the outer perimeter of said teat-receiving section; support means for maintaining said elastic means in position; and a lower milk-receiving section having longitudinally extending walls with normally flat opposing internal surfaces that are spaced only a slight distance over substantially their entire area so as to be capable of very quickly being brought into surface-to-surface engagement as a consequence of relatively slight inward movement of said walls due to the application of inflation collapsing force to their exteriors.

7. The teat cup inflation as stated in claim 6 wherein said upper and lower sections are joined by an intermediate junction section, said intermediate junction section having a cross sectional shape which gradually merges the upper and lower sections so that in the event the teat length is less than the length of the upper section, the lower part of the upper section below the end of the teat collapses and takes the cross sectional shape of the lower section.

References Cited in the file of this patent

UNITED STATES PATENTS

| | | |
|---|---|---|
| 1,361,435 | Armes | Dec. 7, 1920 |
| 1,945,386 | Stampen | Jan. 30, 1934 |

FOREIGN PATENTS

| | | |
|---|---|---|
| 1,036,562 | Germany | Aug. 14, 1958 |